US008291174B2

(12) United States Patent
Resnick

(10) Patent No.: US 8,291,174 B2
(45) Date of Patent: Oct. 16, 2012

(54) MEMORY DEVICE AND METHOD HAVING ON-BOARD ADDRESS PROTECTION SYSTEM FOR FACILITATING INTERFACE WITH MULTIPLE PROCESSORS, AND COMPUTER SYSTEM USING SAME

(75) Inventor: David Resnick, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 738 days.

(21) Appl. No.: 11/893,590

(22) Filed: Aug. 15, 2007

(65) Prior Publication Data

US 2009/0049264 A1 Feb. 19, 2009

(51) Int. Cl.
G06F 12/06 (2006.01)
G06F 12/00 (2006.01)

(52) U.S. Cl. ........ 711/147; 711/118; 711/105; 711/104; 711/5

(58) Field of Classification Search .............. 711/5, 104, 711/105, 154, 163
See application file for complete search history.

(56) References Cited

U.S. PATENT DOCUMENTS

| 4,796,232 | A |  | 1/1989 | House ........................ 365/189 |
| 4,975,878 | A |  | 12/1990 | Boddu et al. ............. 365/189.07 |
| 5,067,071 | A |  | 11/1991 | Schanin et al. ............... 395/275 |
| 5,163,139 | A |  | 11/1992 | Haigh et al. ................. 395/375 |
| 5,420,994 | A |  | 5/1995 | King et al. |
| 5,457,482 | A |  | 10/1995 | Rhoden et al. ............... 345/201 |
| 5,488,583 | A |  | 1/1996 | Ong et al. .................... 365/201 |
| 5,524,225 | A |  | 6/1996 | Kranich |
| 5,682,344 | A | * | 10/1997 | Seyyedy ...................... 365/145 |
| 5,737,757 | A |  | 4/1998 | Hassoun et al. ............. 711/145 |
| 5,802,541 | A |  | 9/1998 | Reed .............................. 711/1 |
| 5,907,861 | A | * | 5/1999 | Seyyedy ...................... 711/152 |
| 5,978,915 | A |  | 11/1999 | Lisart |
| 6,049,487 | A |  | 4/2000 | Plants et al. ............. 365/189.04 |
| 6,081,876 | A |  | 6/2000 | Brewer et al. ................. 711/163 |
| 6,321,314 | B1 |  | 11/2001 | Van Dyke .................... 711/163 |
| 6,343,346 | B1 |  | 1/2002 | Olnowich |
| 6,378,049 | B1 |  | 4/2002 | Stracovsky et al. .......... 711/147 |
| 7,174,429 | B2 |  | 2/2007 | Revilla et al. |
| 7,320,100 | B2 |  | 1/2008 | Dixon et al. .................. 714/758 |

(Continued)

FOREIGN PATENT DOCUMENTS

EP 0 718 769 * 6/1996

OTHER PUBLICATIONS

TW Search Report for Application No. 097130737 dated Dec. 23, 2011.

(Continued)

*Primary Examiner* — Mardochee Chery
(74) *Attorney, Agent, or Firm* — Dorsey & Whitney LLP

(57) ABSTRACT

A memory device includes an address protection system that facilitates the ability of the memory device to interface with a plurality of processors operating in a parallel processing manner. The protection system is used to prevent at least some of a plurality of processors in a system from accessing addresses designated by one of the processors as a protected memory address. Until the processor releases the protection, only the designating processor can access the memory device at the protected address. If the memory device contains a cache memory, the protection system can alternatively or additionally be used to protect cache memory addresses.

5 Claims, 3 Drawing Sheets

U.S. PATENT DOCUMENTS

| | | | |
|---|---|---|---|
| 7,421,564 B1 * | 9/2008 | Rahim et al. | 711/219 |
| 7,565,593 B2 | 7/2009 | Dixon et al. | 714/754 |
| 7,574,576 B2 * | 8/2009 | Kato et al. | 711/163 |
| 7,676,728 B2 | 3/2010 | Resnick et al. | 714/764 |
| 2003/0018860 A1 | 1/2003 | Krueger | 711/152 |
| 2003/0056143 A1 | 3/2003 | Prabhu | |
| 2003/0221091 A1 | 11/2003 | Henry et al. | |
| 2004/0093458 A1 | 5/2004 | Kanno et al. | |
| 2004/0093467 A1 | 5/2004 | Shen et al. | |
| 2005/0022065 A1 | 1/2005 | Dixon et al. | 714/42 |
| 2005/0097276 A1 | 5/2005 | Lu et al. | 711/118 |
| 2005/0144375 A1 | 6/2005 | Bains et al. | 711/105 |
| 2005/0207257 A1 * | 9/2005 | Skidmore | 365/230.01 |
| 2006/0047886 A1 * | 3/2006 | Leaback | 711/5 |
| 2006/0190671 A1 * | 8/2006 | Jeddeloh | 711/5 |
| 2007/0067556 A1 | 3/2007 | Dixon et al. | 711/106 |
| 2007/0091707 A1 | 4/2007 | Hidaka | |
| 2007/0101238 A1 | 5/2007 | Resnick et al. | 714/763 |
| 2007/0113150 A1 | 5/2007 | Resnick et al. | 714/763 |
| 2008/0155217 A1 * | 6/2008 | Kato et al. | 711/163 |
| 2008/0183984 A1 | 7/2008 | Beucler et al. | |
| 2008/0189557 A1 * | 8/2008 | Pipitone et al. | 713/193 |
| 2009/0006800 A1 | 1/2009 | Bellofatto et al. | |
| 2009/0049245 A1 | 2/2009 | Resnick | 711/118 |
| 2009/0049250 A1 | 2/2009 | Resnick | 711/147 |
| 2011/0029712 A1 | 2/2011 | Resnick | 711/5 |
| 2011/0191548 A1 | 8/2011 | Miller et al. | |

OTHER PUBLICATIONS

International Search Report & Written Opinion dated Feb. 25, 2009 for PCT/US2008/072784, Feb. 25, 2009.

* cited by examiner

MEMORY DEVICE AND METHOD HAVING ON-BOARD ADDRESS PROTECTION SYSTEM FOR FACILITATING INTERFACE WITH MULTIPLE PROCESSORS, AND COMPUTER SYSTEM USING SAME

TECHNICAL FIELD

This invention relates generally to memory devices, and, more particularly, to a memory device and method that facilitates access by multiple memory access devices, as well as memory systems and computer systems using the memory devices.

BACKGROUND

As computer and computer system architecture continues to evolve, the number of processing cores and threads within cores is increasing geometrically. This geometric increase is expected to continue, even for simple, relatively inexpensive computer systems. For server systems, system sizes measured in the number of processors are increasing at an even faster rate.

Although this rapid increase in the number of scores and threads enhances the performance of computer systems, it also has the effect of making it difficult to apply the increasing parallelism to single applications. This limitation exists even for high-end processing tasks that naturally lend themselves to parallel processing, such as, for example, weather prediction. One of the major reasons for this limitation is that the number of communication paths between processors, cores, and threads increases disproportionately to the number of times the task is divided into smaller and smaller pieces. Conceptually, this problem can be analogized to the size of a processing being represented by the volume of a 3D cube. Each time this volume is divided into smaller cubes, the total surface area of the cubes, which represents data that must be communicated between the processors working on sub-cubes, increases. Every time that the number of processors goes up by a factor of eight the total amount of information to be communicated between the greater number of processors doubles.

One reason for these problems caused by increasing parallelism is that most systems communicate by sending messages between processors, rather than sharing memory. This approach results in high latencies and high software overheads, although it may simplify some complex system architecture, operating system, and compiler issues. Unfortunately, as the level of parallelism increases, the processors in the system reach the point where all they are doing is managing message traffic rather than actually doing useful work.

There is therefore a need for a system and method that can reduce software overhead and eliminate or at least reduce performance bottlenecks thereby improving system performance and architectural scalability at relatively low cost.

DETAILED DESCRIPTION

Figure 1:
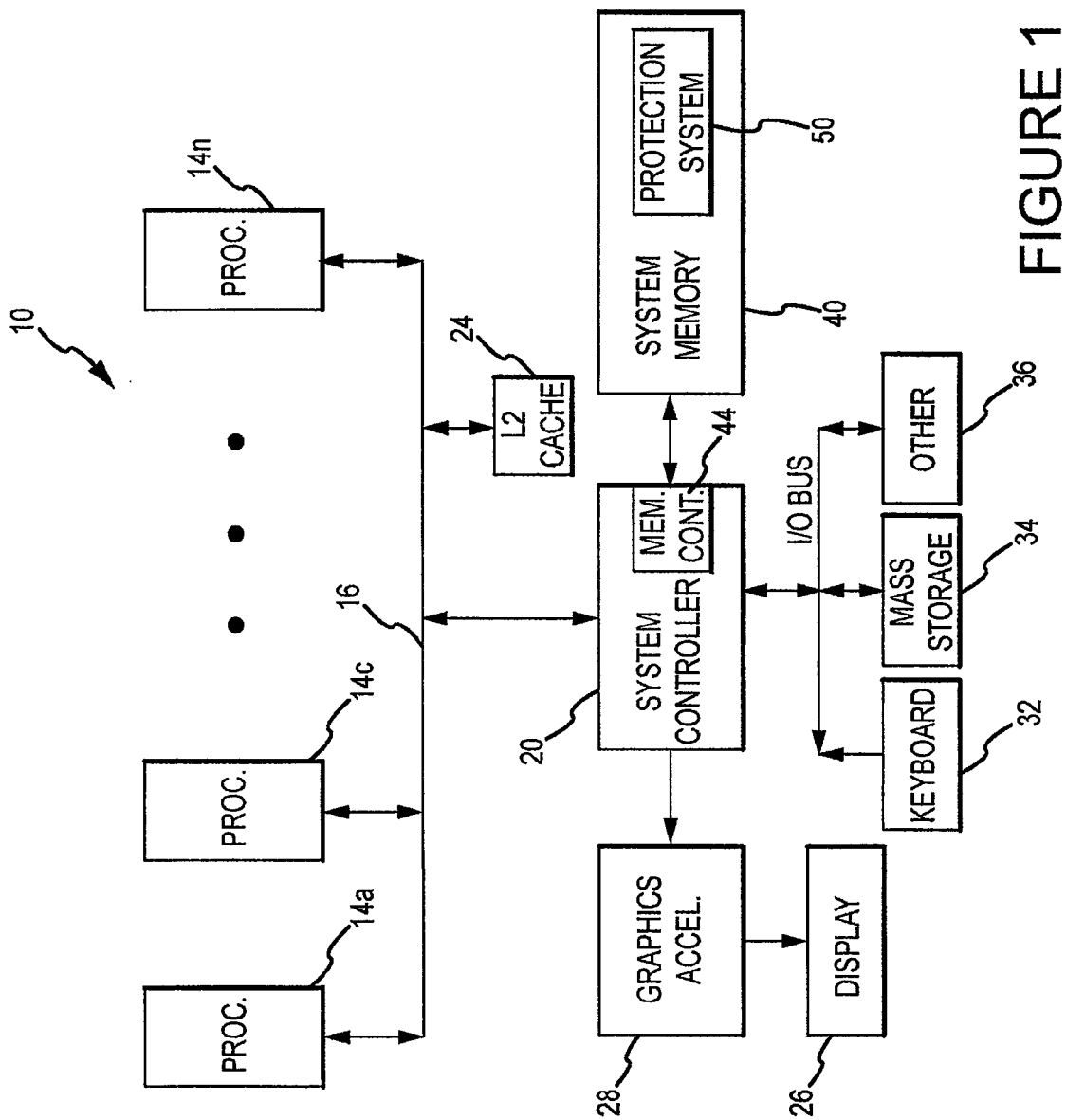
FIG. 1 is a block diagram of a computer system according to one embodiment.

A computer system 10 according to one embodiment is shown in FIG. 1. The computer system 10 includes several parallel processors $14_{1-N}$ connected to a common processor bus 16. Also connected to the processor bus 16 are a system controller 20 and a level 2 ("L2") cache 24. As is well known in the art, each of the processors $14_{1-N}$ may include a level 1 ("L1") cache.

The system controller 20 drives a display 26 through a graphics accelerator 28, which may include a graphics processor and graphics memory of conventional design. Also connected to the system controller 20 is an input/output ("I/O") bus 30, such as a peripheral component interconnect ("PCI") bus, to which are connected a keyboard 32, a mass storage device 34, such as a hard disk drive, and other peripheral devices 36. Of course there can also be systems such as servers, that do not have directly connected keyboard, graphics or display capabilities, for example.

The computer system 10 also includes system memory 40, which may be a dynamic random access memory ("DRAM") device or sets of such devices. The system memory 40 is controlled by memory controller circuitry 44 in the system controller 20 through a memory bus 46, which normally includes a command/status bus, an address bus and a data bus. There are also systems in which the system and memory controller is implemented directly within a processor IC. As described so far, the computer system 10 is conventional. However, the system memory 40 departs from conventional systems by including in the system memory 40 an address protection system 50 that enhancers the ability of the parallel processors $14_{1-N}$ to access the system memory 40 in an efficient, low latency manner. It should also be understood that the system 50 may be used in memory devices in a computer or other processor-based systems that differ from the computer system 10 shown in FIG. 1. For example, servers and other high-end systems will generally not include the graphics accelerator 28, the display 26, the keyboard 32, etc., but will have disk systems or simply connect to a network of other similar processors with attached memory.

The protection system 50 or a processing system according to some other embodiment can be implemented in the system memory 40 while keeping the internal organization of the memory system substantially the same as in conventional system memories. For example, bank timing and memory data rates can be substantially the same. Further, the system 50 need not be particularly fast as the operations needed are generally simple and fit with current and anticipated memory clock rates. The protection system 50 is used to prevent at least some of the processors $14_{1-N}$ from accessing the system memory 40 at a given time while allowing at least one of the processors $14_{1-N}$ to access the system memory 40. The protection system 50 can therefore solve data coherency problems that can be a major issue in implementing parallel applications. For example, when multiple processes need to update common data, the updates must appear such that the processes perform the updates serially. Complex hardware and software is added to high-end systems to enable this. The lack of this additional hardware and software in less expensive computer system can be a major deterrent to increasing parallelism in such computer systems. The protection system, by creating "protected" memory locations, enables this coherency to happen in a natural straightforward way that has minimum impact on system requirements. In addition to providing coherency between processes, the protection system may enable data to be updated in some process somewhere in a system, while the operation appears indivisible to other processes in that they are prevented from referencing that data while the other process is updating it.

Figure 2:
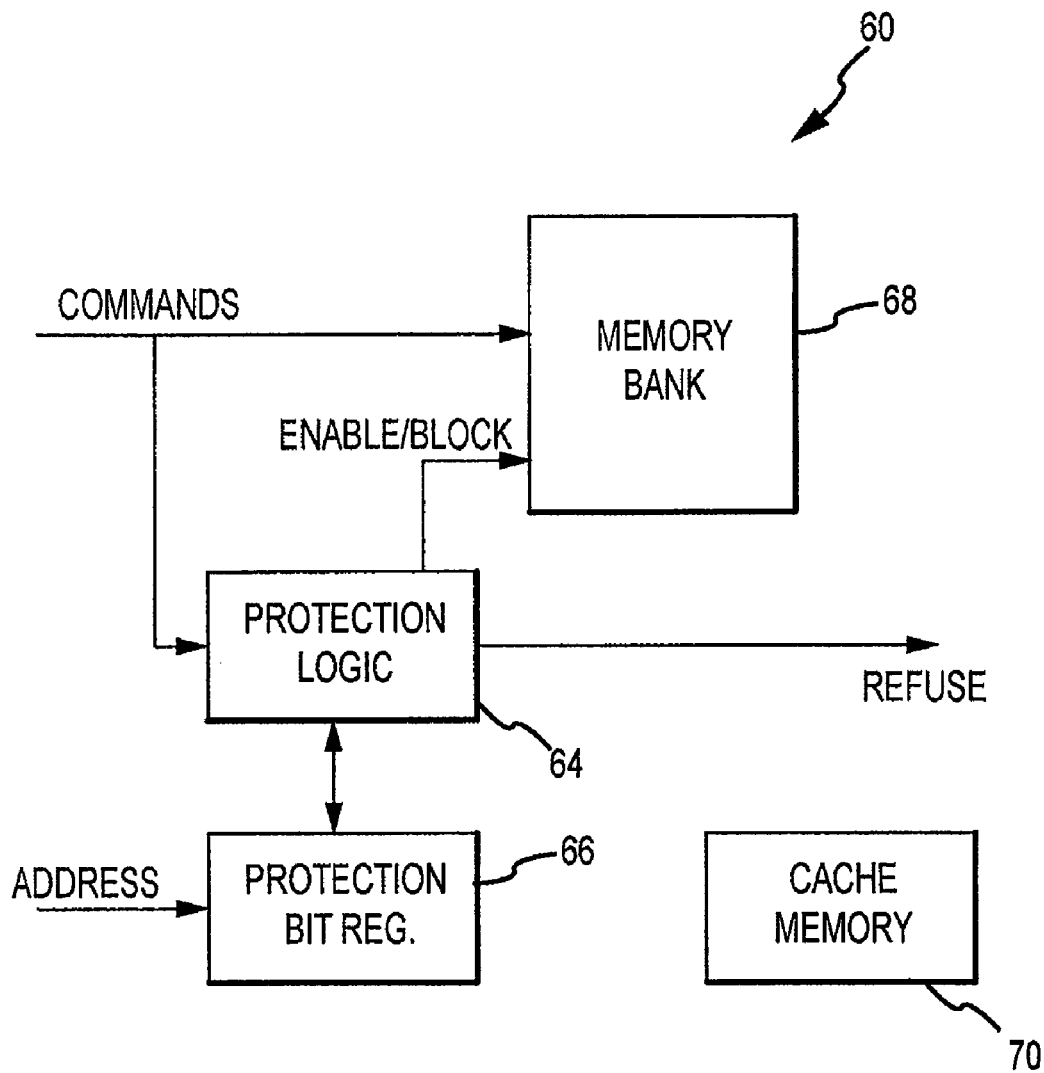
FIG. 2 is block diagram of a portion of a system memory device containing an address protection system according to one embodiment that may be used in the computer system of FIG. 1.

A portion of an address protection system 60 that may be used in the system memory device 40 according to one embodiment is shown in FIG. 2. The protection system 60 is used to prevent at least some of the processors $14_{1-N}$ from accessing the system memory 40 at a given time while allowing at least one of the processors $14_{1-N}$ to access the system memory 40. The Protection System 60 supports multi-processor, multi-thread coherency such that, if a reference is protected, modified commands must be used in referencing a particular protected address. When a memory address is "protected" a processor $14_{1-N}$ must issue protected references so that it can access and modify data, while other processors $14_{1-N}$ that attempt to reference or modify that data item with normal memory commands are prevented from accessing the protected data. That memory addresses are protected or unprotected can provide for coherency coordination between processors and processes. One processor $14_{1-N}$ can protect a memory location. Other processors $14_{1-N}$ then can use unprotected references to that location waiting for the protection to be dropped thus serving as a flag and ordering mechanism. This protection protocol then is the basis for a very general purpose communication and coherency implementation that can be used in multiple ways by application and OS software.

With reference to FIG. 2, the Protection System 60 includes Protection Logic 64 that receives address bits from a Protection Bit Register 66. The address of a protected location, such as a row, is provided to the Protection Bit Register 66 at the same time that a protection command is provided to the Protection Logic 64. The Protection Bit Register 66 then continues to apply the protected address to the Protection Logic 64 until the protection is released by a corresponding command provided to the Protection System 60. The Protection Logic 64 normally routes signals to a Memory Bank 68 that allow a memory operation designated by a command to occur. For example, a chip select ("CS") signal that is commonly routed to a memory bank to enable its operation may be routed through the Protection Logic 64. In the event an access to a protected address is detected by the Protection Logic 64, the Logic 64 does not couple the CS signal to the Memory Bank 68. Other commands may alternatively be blocked in a similar manner. For example, the combination of signals used to designate a read or a write command may be blocked from the Memory Bank 68 in the event an access to a protected location is detected.

In operation, if a modified command is used to reference a protected address the command (generally read or write) is executed. If a normal (non-protected) reference is made to a protected address, the Protection Logic 64 prevents the reference from being performed and a signal is returned indicating that; the reference is refused. If a protected reference is made to a non-protected address, it also is refused. This protection capability used for coherency operations is described in greater detail below. In support of the protected operations, another line may be provided in the memory bus 46 (FIG. 1), which indicates a reference attempt has violated the protection protocol. By having the memory device 40 provide protected access, the design of the memory controller 44 is simplified over what would be needed if the controller 44 were to support protection and coherency. The memory controller 44 does not have to keep a copy of the each item of protected data active and possibly actually implementing the atomic operations, or even keep track of what addresses are protected. The memory controller 44 can associate a particular address with a specific execution thread, return data to and accept data from the thread that holds atomic rights to that address if processors $14_{1-N}$ cannot generate protected references easily by themselves, and can ignore other references to the protected address by other threads, counting on the memory device 40 to prevent access.

When a reference is made to the memory controller 44 that is from the thread that currently has coherent and/or atomic access, the memory controller 44 may modify the command to a protected reference command. However, the memory controller 44 preferably obtains a different reference type for coherent and remote atomic references, simplifying the design of the memory controller 44. When it detects the different reference type, the controller 44 generates a protected reference that is different than an unprotected reference, and sends that to the memory device 40. If a protected reference is made to a non-protected address, the reference is refused, the same as if a standard reference is made to a protected address. The Refused/Accepted status of the request is then passed back to the requesting processor. However, in some embodiments, the memory controller 44 handles conflicting accesses to protected addresses so that traffic to the memory device 40 is reduced and made available for other references.

The protection system 60 is also usable if the memory device 40 includes a cache memory 70, although a cache memory is not required. Instead of protecting accesses to the Bank 68, the Protection Logic 64 instead or additionally can protect access to the cache memory 70 in the same manner as described above. More specifically, when a location in a cache line is protected, that line becomes locked in the cache memory 70 and cannot be evicted in normal cache references. If a cache miss reference is made in which only locked lines are available to be evicted, the reference is made to the Bank 68 but the referenced line is not cached. Each line in the cache memory 70 can have multiple addresses that have protection. For example, each cache line can have 256 to 1024 lock ranges. Each individual lock protects all references within the address range for that particular lock. If there are 256 lock positions in a cache line, and lines are 1 Kbyte in size, then each lock covers 4-bytes/32-bits in a cache line. If 16×4 parts are accessed for a memory reference then 16×32 bits=512 bits=64 bytes are covered with each lock.

In another embodiment, a relatively small number of registers, such as four, is associated with each cache line, with each register holding a column address for that line. When a reference is made, each of the registers is compared with the corresponding bits of the requesting address. Matching any register contents indicates a protected address. Setting a lock and release then involve entering and clearing or invalidating the protection registers. The registers can be implemented as a push-down stack. This would allow protection down to the individual transfer level, but limit the number of locks to be much smaller than having individual bit-locks.

In still other embodiments, each register in a sub-cache also carries an ID code that is stored when a lock is set. As protected references are always to the cache memory 70, some of the row address bits can be used as identifiers ("ID codes") for individual locks. The memory controller 44 stores the ID codes, which can then be used to prevent the locks from one program interfering with those of another program.

In operation, the memory controller 44 first sends a Set Lock function to the memory device 40. The lock can be set for an address that is already in the cache memory 70 or for an address that must be fetched from the Bank 68 like a regular miss sequence. The protected read or write reference is then sent to the memory device 40 and the protected state and address are stored in the Protection Bit Register 66. That a protected reference is made indicates that lock protection must be found that corresponds to the requested address. Protected reads and writes can be done as many times as desired to addresses in the protected range. After the accesses have been completed, the memory controller 44 sends a Release Lock function to the Protection Logic 64 since protection of the locked address is no longer needed. The memory controller 44 will therefore keep references to each memory address in order with respect to other requests for the same address. Therefore, any requests that are after the Release Lock is sent will be a non-protected reference.

One example of a mapping of command functions that may be sent by the memory controller 44 is shown in Table 1, below, in which 'x' indicates a "don't care" bit. The command functions are coded using the RAS, CAS, and DM signals that the memory controller 44 normally transmits to the memory device 40, and they are decoded by logic added to the function decode logic in the system memory 40 and by the Protection Logic 64. With the protection active, the normal functions indicated by those signals are modified.

TABLE 1

| RAS# | CAS# | DM | Function |
|---|---|---|---|
| 0 | 1 | x | Activate line (no Rd or Wr) |
| 1 | 0 | x | Unprotected cache reference (Rd or Wr) |
| 0 | 0 | x | Protected cache reference (Rd or Wr) |
| 1 | 1 | 1 | Set Lock |
| 1 | 1 | 0 | Release Lock |

With reference to Table 1, the Release Lock function is treated as a protected reference. If the reference address is in the cache 70, but not protected, nothing is done, and the memory device 40 returns a "refused/hit" indication. If the referenced address is not in the cache memory 70, the memory device 40 returns a "refused/miss" indication. If the referenced address is successful in providing an access to the cache memory 70, the memory device 40 returns an "accepted/hit" indication, and the memory controller 44 then clears the protection.

Figure 3:
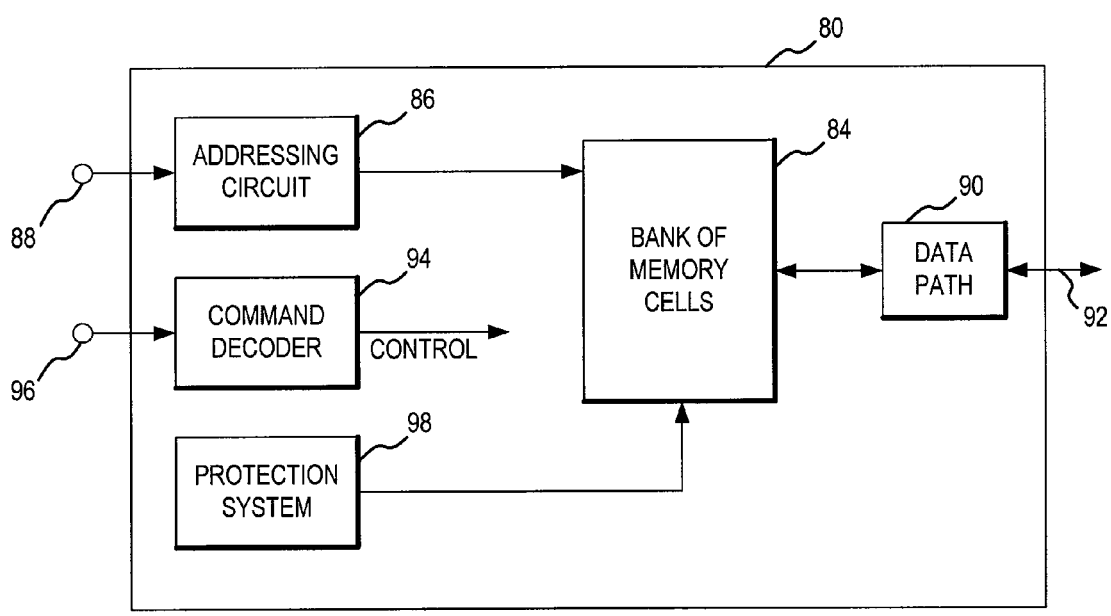
FIG. 3 is a block diagram of a memory device according to one embodiment that may be used in the computer system of FIG. 1.

FIG. 3 shows one embodiment of a memory device 80. The memory device 80 includes at least one bank of memory cells 84 coupled to an addressing circuit 86 that is coupled between external terminals 88 and the at least one bank of memory cells 84. The memory device 80 also includes a data path 90 coupled between 92 external terminals and the at least one bank of memory cells 84. Also included in the memory device 80 is a command decoder 94 coupled to external terminals 96. The command decoder 94 is operable to generate control signals to control the operation of the memory device 80. Finally, the memory device 80 includes a protection system 98 coupled to the at least one bank of memory cells 84. The protection system is operable to prevent at least one of a plurality of memory requestors (FIG. 1) from accessing the at least one bank of memory cells 84 responsive to a signal from another of the memory requestors (FIG. 1). The protection system 60 shown in FIG. 2 may be used as the protection system 98, or some other embodiment of a protection system may be used as the protection system 98.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A computer system, comprising:
   a plurality of processors operating in parallel to perform parallel processing functions;
   a system controller coupled to the processors, the system controller including a memory controller; and
   a system memory device coupled to the memory controller, the system memory device comprising:
      at least one bank of memory cells;
      an addressing circuit coupled to the memory controller, the addressing circuit being operable to address the at least one bank of memory cells responsive to address signals received from the memory controller;
      a data path coupled to the memory controller, the data path being operable to couple write data from the memory controller and to couple read data from the at least one bank of to the memory controller;
      a command decoder coupled to the memory controller, the command decoder being operable to generate control signals to control the operation of the memory device responsive to memory command signals received from the memory controller; and
      a protection system coupled to the at least one bank of memory cells, the protection system being operable to prevent at least one of a plurality of the processors from accessing the at least one bank of memory cells responsive to a signal from another of the processors, the protection system having protection logic operable to receive at least one control signal providing access to the at least one bank of memory cells, wherein the protection logic being operable to couple the at least one control signal to the at least one bank of memory cells responsive to receiving address signals from the memory controller indicative of an access to a protected address in the at least one bank of memory cells only if the protection logic receives a signal indicating that a selected one of the processors has originated the access to the at least one bank of memory cells, the protection logic being operable to inhibit coupling the at least one control signal to the at least one bank of memory cells responsive to receiving address signals from the memory controller indicative of an access to a protected address in the at least one bank of memory cells if the protection logic receives a signal indicating that another of the processors has originated the access to the at least one bank of memory cells.

2. The computer system of claim 1 wherein the protection system further comprises:
   a protection bit register coupled to the memory controller, the protection bit register being operable to receive and store address bits received from the memory controller indicative of an address in the at least one bank of memory cells that is to be protected.

3. The computer system of claim 2 wherein the protection system further comprises:
   protection logic operable to receive at least one control signal providing access to the at least one bank of memory cells, the protection logic further being operable to receive from the protection bit register the address bits indicative of an address that is to be protected, the protection logic being operable to selectively couple the at least one control signal to the at least one bank of memory cells responsive to receiving address signals indicative of an access to a protected address in the at least one bank of memory cells.

4. The computer system of claim 1 wherein the at least one control signal comprises a chip select signal.

5. The computer system of claim 1 wherein the memory device further comprises a cache memory, and wherein the protection system is further operable to prevent at least one of the processors from accessing the cache memory responsive to a signal from another of the processors.

* * * * *